(12) United States Patent
Braun et al.

(10) Patent No.: US 7,752,740 B2
(45) Date of Patent: Jul. 13, 2010

(54) APPARATUS FOR LAYING AT LEAST ONE ELECTRIC LINE INTO THE GROOVES OF A LONGITUDINAL STATOR

(75) Inventors: Juergen Braun, Dachau (DE); Xiufei Liu, Munich (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 845 days.

(21) Appl. No.: 11/547,301

(22) PCT Filed: Jun. 21, 2005

(86) PCT No.: PCT/DE2005/001105

§ 371 (c)(1),
(2), (4) Date: Oct. 4, 2006

(87) PCT Pub. No.: WO2006/002611

PCT Pub. Date: Jan. 21, 2006

(65) Prior Publication Data

US 2008/0307639 A1     Dec. 18, 2008

(30) Foreign Application Priority Data

Jun. 30, 2004  (DE) .................. 10 2004 032 269

(51) Int. Cl.
*B23P 19/00*  (2006.01)
(52) U.S. Cl. ............... 29/732; 29/596; 29/606; 29/736; 29/824
(58) Field of Classification Search ........... 29/596–598, 29/732–736, 605–606, 824; 310/12, 27, 310/42, 184, 208
See application file for complete search history.

(56) References Cited

U.S. PATENT DOCUMENTS

| | | | |
|---|---|---|---|
| 4,557,038 A | 12/1985 | Wcislo et al. | |
| 4,860,430 A | 8/1989 | Raschbichler | |
| 4,918,835 A | 4/1990 | Wcislo et al. | |
| 6,170,635 B1 | 1/2001 | Rommelli | |
| 7,047,623 B2 * | 5/2006 | Funken et al. | ......... 29/596 |
| 2003/0029025 A1 | 2/2003 | Funken et al. | |

FOREIGN PATENT DOCUMENTS

| | | |
|---|---|---|
| DE | 33 23 691 | 1/1985 |
| DE | 37 37 719 | 5/1989 |
| DE | 198 33 418 | 6/1999 |
| DE | 100 11 117 | 10/2001 |
| GB | 1 530 981 | 11/1978 |

* cited by examiner

*Primary Examiner*—Minh Trinh
(74) *Attorney, Agent, or Firm*—Michael J. Striker (57) ABSTRACT

The invention relates to a laying vehicle for laying electric lines (8) in the grooves (6) of an inductor (4), for example a longitudinal stator of a maglev railway. The laying vehicle contains a first, preceding vehicle part (11) comprising a bending and offset unit (14) for configuring winding undulations, a second following vehicle part (16) comprising a pressing station (18) for pressing limbs (8a) of the undulations into the grooves (6), the second vehicle part (16) being displaceable in relation to the first vehicle part (11) and a slide (15) that is coupled in a driven manner to the first vehicle part (11), for transferring the undulations to the second vehicle part (16). According to the invention, a delivery unit (27), which is coupled to the second vehicle part (16), is located between the slide (15) and the pressing station (18), said unit receiving the limbs (8a) from the slide (15) and transferring them to the pressing station (18) at essentially constant intervals.

10 Claims, 7 Drawing Sheets

APPARATUS FOR LAYING AT LEAST ONE ELECTRIC LINE INTO THE GROOVES OF A LONGITUDINAL STATOR

CROSS-REFERENCE TO RELATED APPLICATION

The invention described and claimed hereinbelow is also described in German Patent Application DE 10 2004 032 269.4 filed on Jun. 30, 2004. This German Patent Application, whose subject matter is incorporated here by reference, provides the basis for a claim of priority of invention under 35 U.S.C. 119 (a)-(d).

BACKGROUND OF THE INVENTION

Laying vehicles of this kind are particularly known for magnetic levitation railways, which for example are driven by a long-stator linear motor and which, for this purpose, have an inductor in form of a long-stator that extends over the entire guideway and is provided with grooves. These grooves serve to accommodate a traveling-field winding laid like an meander-shaped undulation and formed from three electrical lines corresponding to the three phases of an electrical three-phase current winding, wherein these three lines are alternately inserted only into every third groove. As these lines are comparably rigid, they are bent like a meander before being inserted into the grooves, thus creating so-called undulations (meanders), which comprise straight limbs coming to rest in these grooves as well as bent winding heads connecting the limbs and being mounted outside the grooves. Since the winding heads belonging to different lines cross over each other, they must also be offset, i.e. be bent transversely to the planes in which the undulations lie. All of this is associated with a plurality of working steps and requires strenuous labor if laid manually, because the grooves of an already mounted long-stator are usually open to the bottom and because the lines, therefore, must be pressed from below into the grooves.

For ease of work and far-reaching automation of laying work, a laying vehicle movable along the guideway is known (DE 33 23 691 A1) which is equipped with supply spools for meander-shaped prefabricated and offset lines as well as with a pressing station for automatically pressing (inserting) the limbs of the undulations into the grooves of the long-stator. As the lengths of the windings which can be wound onto the supply spools are comparably small, a laying vehicle is already known that is equipped with a complete bending and offset unit. Thereby, the shaping of the lines can be executed on the laying vehicle and consequently, the length of the lines carried on the supply spools can be substantially increased (e.g. DE 37 37 719 C2). To remedy any deficiencies that might occur, a laying vehicle has also become known which provides a spatial separation of the pressing station from the bending and offset unit as well as transport device in form of an endless circulating transport rope for transporting the preshaped lines from the bending and offset unit to the pressing station (DE 198 33 418 A1). Furthermore, a laying vehicle is known in which the bending and offset unit as well as the pressing station are mounted on a mounting carriage that can be moved to and fro on the laying vehicle (DE 100 11 117 B4). Thereby it is possible for the laying vehicle and the supply spools of the lines to move at constant speed and continuously, respectively, along the guideway, whereas the mounting carriage is kept on standstill relative to the long-stator during those phases in which the undulations are pressed into the grooves (=pressing steps) and is moved between the pressing steps to the next pressing position (=transport steps) at a speed increased in comparison with the laying vehicle.

In their practical application, the vehicles described have not proved to be adequately reliable and fast, and moreover they at least partly require substantial constructive cost and expenditure. In practice, therefore, laying vehicles of the species designated hereinabove are nowadays used in which the bending and offset unit is mounted on a preceding vehicle part, while the pressing station is mounted on a succeeding (following) vehicle part. A slide (chute) carried along by the preceding vehicle part serves to transfer the undulations discharged from the bending and offset unit to the pressing station.

A problem not yet solved satisfactorily with any of the laying vehicles described herein-above lies in that the distances of the undulation limbs to be inserted into the grooves fail to remain exactly constant on their way from the bending and offset unit to the pressing station, particularly if circulating transport ropes or mounting carriages moving to and fro are provided on the laying vehicle or if the laying vehicle comprises vehicle parts that are movable relative to each other. Therefore, with the laying vehicles of the species designated hereinabove, plates or other fixing means serving as spacers are utilized into which the undulation limbs are laid when they leave the bending and offset unit. On the one hand this produces a disadvantage in that these fixing means must be manually removed from the undulations when they reach the pressing station and that the undulation limbs then must also be laid manually onto the pressing element of the pressing station which calls for additional manpower. On the other hand, during the pressing steps, only one undulation limb at a time can be pressed into the pertinent groove of the long-stator, thus limiting the laying speed.

SUMMARY OF THE INVENTION

The technical problem of the present invention, therefore, is to configure the vehicle of the species designated hereinabove in such a manner that the undulation limbs are automatically transferred with the required, essentially constant spacings to the pressing station and that such a transfer is even possible if a pressing station comprising more than one pressing element is provided for increasing the laying speed.

The invention is explained in greater detail hereinafter by the example of a magnetic levitation railway comprising a long-stator linear motor and based on the drawings enclosed hereto which are drawn in different scales, where.

BRIEF DESCRIPTION OF THE DRAWINGS

DESCRIPTION OF THE PREFERRED EMBODIMENTS

Figure 1:
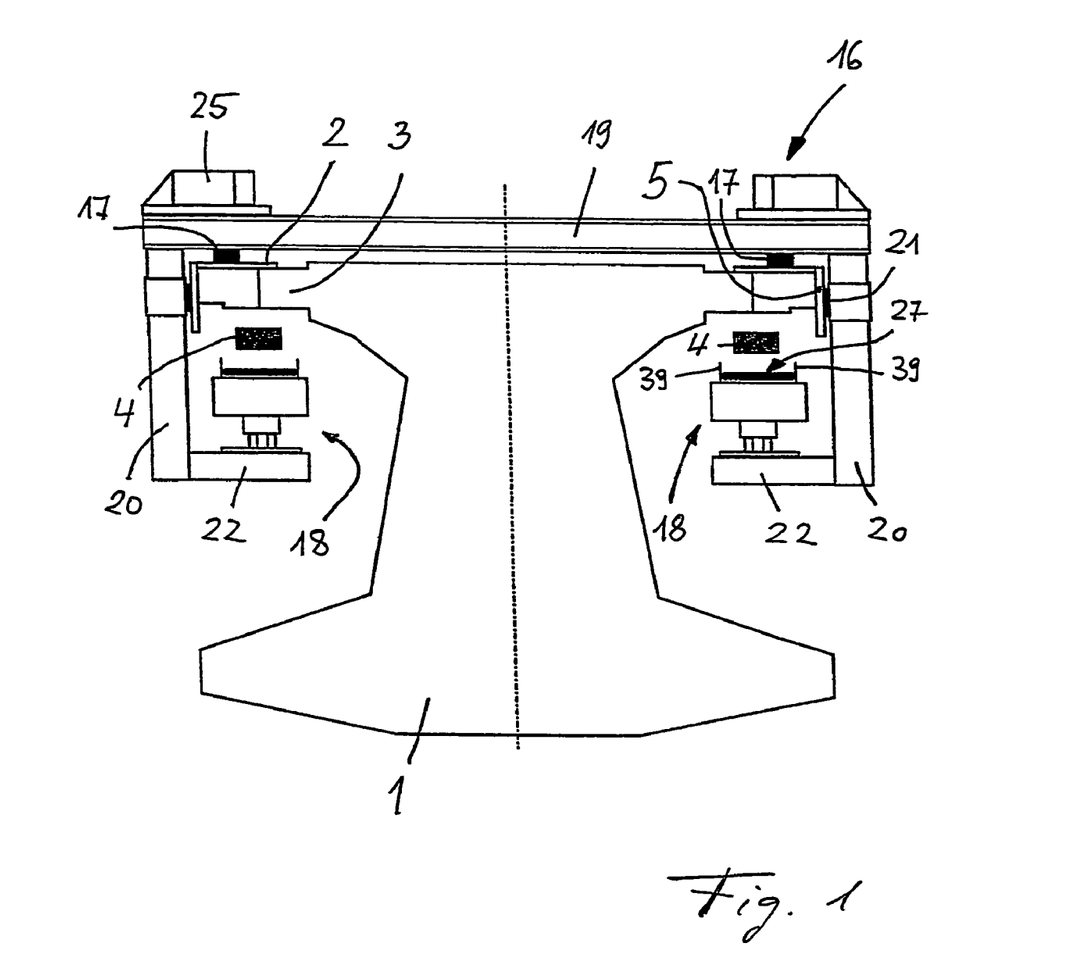
FIG. 1 shows a schematic cross-section through a guideway of a magnetic levitation railway and a laying vehicle according to the present invention that is supported by this guideway.

According to FIG. 1, a guideway for magnetic levitation railways comprises a plurality of carriers (supports) 1 which are arranged one behind the other in the direction of a preselected route and which have cover plates 3 provided with gliding strips 2 at their upper sides. Magnetic levitation vehicles not shown here are provided with gliding skids at their undersides, by way of which they can be set-down onto the gliding strips 2 or on which they may even glide in case of emergency. Fastened to the underside of the cover plate 3 is at least one long-stator 4, which is composed of a plurality of sheet packs arranged one behind the other in the direction of the guideway and which together with carrying magnets fastened to the magnetic levitation vehicles form a linear motor. Moreover, lateral guide rails 5 are also fastened to the longitudinal sides of the carriers 1 to serve for track guidance of the magnetic levitation vehicles.

Figure 2:
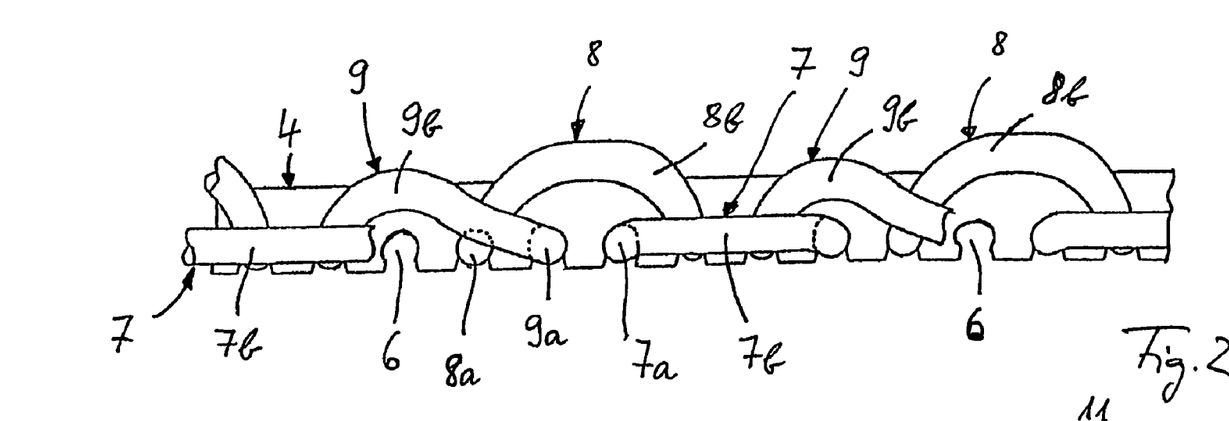
FIG. 2 shows a schematic, partly broken-off side view of a partial section of a long-stator of said guideway according to FIG. 1.
Figure 7:
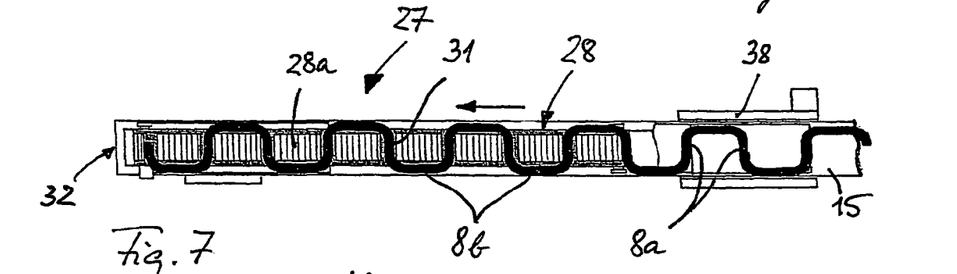
FIG. 7 shows a top view on the conveying unit according to FIG. 6.

In accordance with FIG. 2, the long-stator or inductor 4 comprises grooves 6 that are open to the bottom and extend transversely to the direction of travel (arrow v), said grooves being provided with a cross-sectional constriction in a lower part. Arranged in every third groove 6 is an electrical line 7 which is bent to so-called undulations (meanders) in such a manner that it has straight winding limbs 7a coming to rest in the grooves 6 as well as bent winding heads 7b connecting the limbs and lying outside the grooves 6, as shown in FIG. 2 and FIG. 7 and explained further below in detail. On the whole, three lines 7, 8 and 9 (FIG. 2) of this type are provided, the limbs 7a, 8a and 9a of which lie in assigned grooves 6 in alternating succession as shown on FIG. 2 and which form the three phases of an alternating current winding of the long-stator linear motor. To prevent the winding heads 7b, 8b and 9b of the three lines 7, 8 and 9 from hitting against each other at the crossover points, at least the winding heads 8b and 9b are offset in a characteristic manner, as clearly shown on FIG. 2, i.e. they are bent out towards the top from the plane of the undulations.

A laying vehicle which will be deposited on the guideway after the latter has been constructed, can be moved by driving means, not shown, e.g. in the direction of arrow v and serves for a far-reaching automation of the laying of lines 7, 8, and 9. Since laying of the three lines 7, 8, and 9 (FIG. 2) is carried out consecutively and basically in the same manner, only the laying of line 8 is explained in further detail as set forth below.

Figure 3:
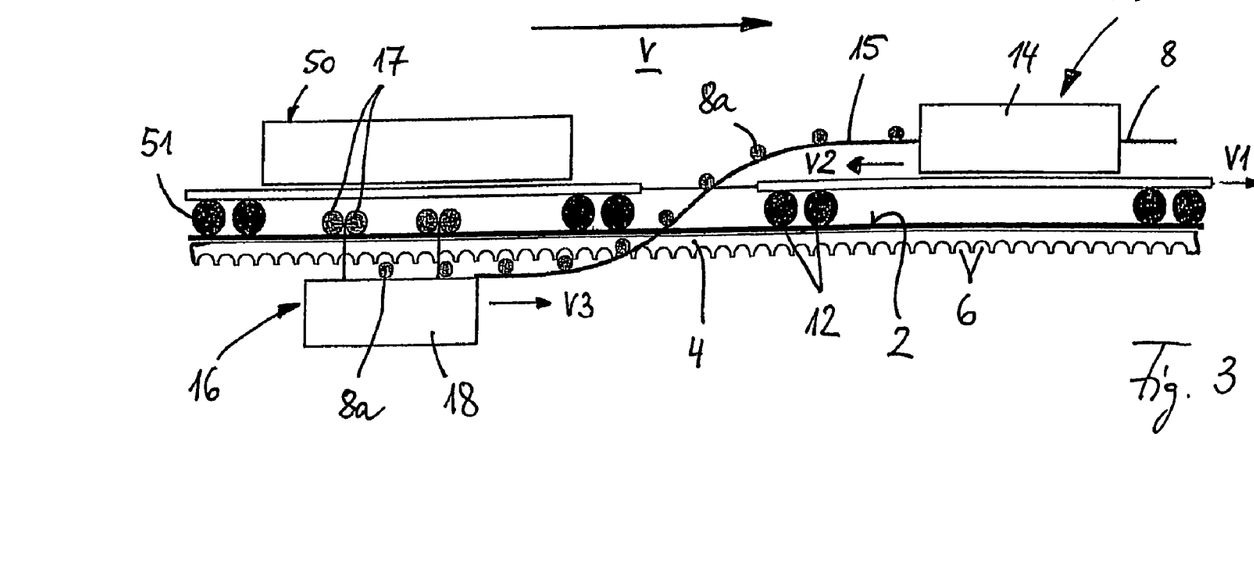
FIG. 3 shows a schematic side view of an actually known laying vehicle for insertion of an electrical line into the grooves of the long-stator according to FIG. 2.

The laying vehicle comprises a first vehicle part 11 preceding in the direction of arrow v and preferably located above the cover plate 3, said vehicle part being provided with rotatably mounted wheels 12 which roll of on the gliding strips 2 (FIG. 1). As shown schematically in FIG. 3, the vehicle part 11 carries a bending and offset unit 14, in which the line 8 unreeled from a supply (reservoir) spool is bent to adopt the meander shape depicted in FIG. 7 and offset according to FIG. 2. For example, the supply coil is accommodated on a non-shown vehicle part preceding the vehicle part 11 which is coupled to a traction machine provided with a drive motor and which trails the first vehicle part 11. The line 8 which has been shaped to meanderlike undulations, of which only a few of the limbs 8a are shown in FIG. 3, is discharged at a rear end of the bending and offset unit 14 and deposited on a slide 15 carried along with said vehicle part 11, and having its front end, for example, fastened to the rear end of the bending and offset unit 14.

Furthermore, the laying vehicle comprises a second vehicle part 16 following said first vehicle part 11, said vehicle part 16 being preferably located beneath the cover plate 3, but provided with rotatably mounted wheels 17 which also roll-off on the gliding strips 2. The second vehicle part 16 carries a pressing station 18 which is arranged beneath the cover plate 3 and according to FIG. 3 serves the purpose of pressing the limbs 8a of the undulations of line 8 supplied by means of the slide 15 from the bottom into the grooves 6 of said long-stator 4. For this purpose, the line 8 is provided with an elastically deformable sheath to enable it to pass the cross-sectional constrictions of grooves 6 as shown on FIG. 2 and then snap into place elastically behind them, so that there is no need for any additional fixing means. Regardless thereof, the grooves 6 can be provided with appropriately shaped metal sleeves in an actually known manner and in a preceding working step, said metal sleeves serving, for example, to connect the outer sheath surfaces of lines 7, 8, and 9 to earth.

Figure 5:
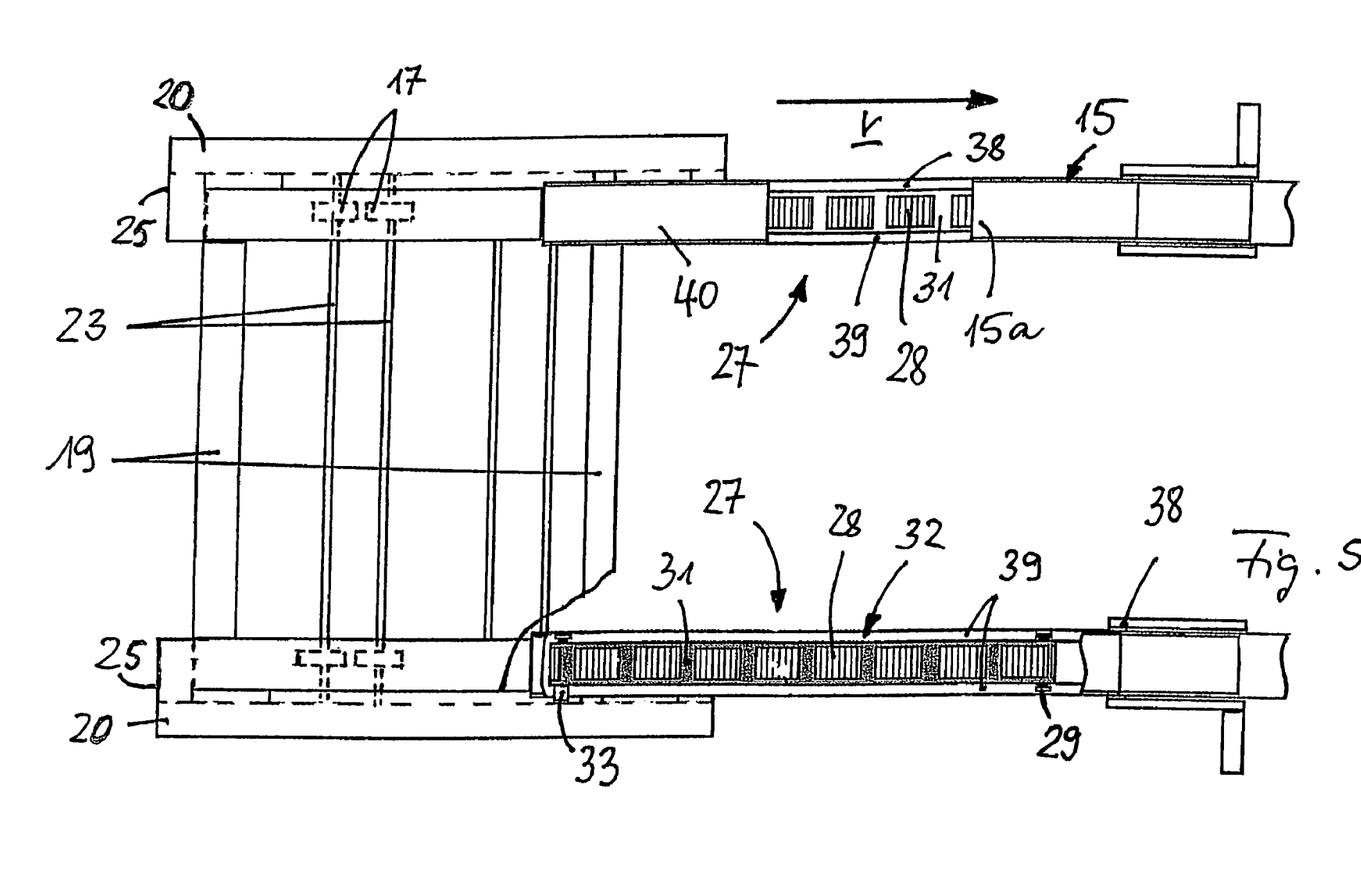

As is particularly shown in FIG. 1 and FIG. 5, the guideway of a magnetic levitation railway is mostly provided with one long-stator 4 each at both of its longitudinal sides. To be able to insert one line 8 each at the same time into the grooves 6 of both long-stators 4, the second vehicle part 16 is provided with two cross beams 19 arranged above the cover plate 3 and supported on the rotary wheels 17, wherein a side part 20 each is fastened to the lateral ends of said cross beams and extends in downward direction, said side parts together with said cross beams 19 forming a U-shaped frame which embraces the cover plate 3 and is open towards the bottom, as is particularly shown in FIG. 1. Rotatably mounted to the insides of said side parts 20 are guide rollers 21 which in mounted status of the second vehicle part 16 roll-off from the outside at the lateral guide rails 5 of said guideway and serve for track-guiding of the second vehicle part 16. Moreover, inwardly protruding support plates 22 are fastened to the bottom ends of each side part 20, and on each support plate a pressing station 18 is mounted for the right and left side of the guideway, respectively. It is self-evident that in this case the first vehicle part 11 can be provided with two bending and offset units 14, each having coupled thereto a slide 15 and being assigned to one of the pressing stations 18 in order to be able to lay the lines simultaneously on both sides of the guideway. Alternately, however, it is also possible to provide only one bending and offset unit and to switch it over, for example, by means of a switch, selectively to one of two pressing stations each provided for the right and left side of the guideway, respectively. Other procedures for laying the lines on the right and left side of the guideway are of course also possible.

Figure 4:
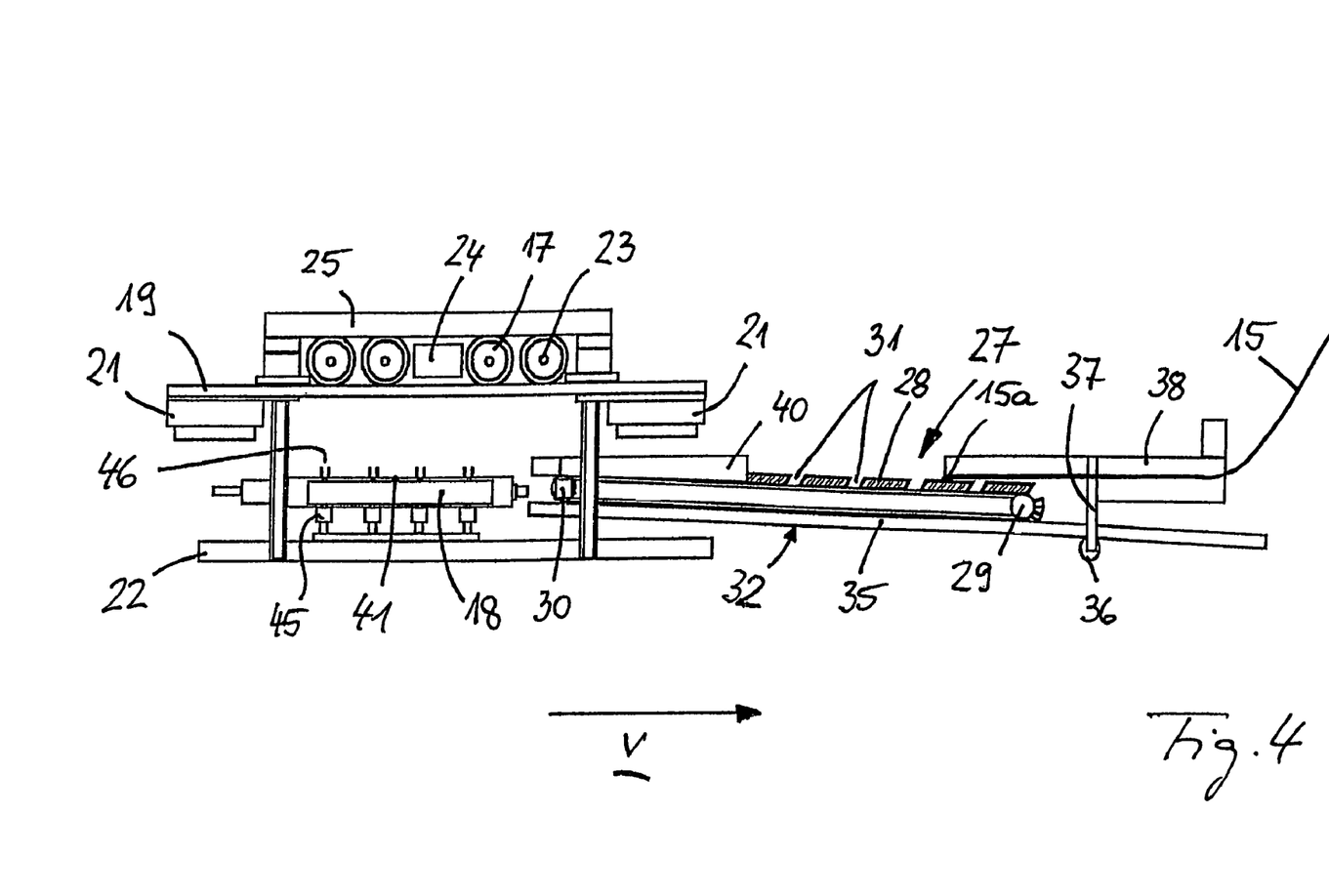
FIG. 4 and FIG. 5 show in a side view and in a partly broken-off top view inventive details of a laying vehicle which in all other respects is mainly configured similarly to the one shown in FIG. 3.

Besides, axles 23 (FIG. 5) for the wheels 17 are mounted on the side parts 20 in a manner not shown here specifically, while a driving means 24 (FIG. 4), e.g. an electric motor with a gear, serves for driving at least one wheel 17. Protective covers 25 (FIGS. 1 and 5) can also be provided, if required.

The components of the laying vehicle described above are known and need not be explained or outlined more precisely to those skilled in the art.

Laying of the line 8 by using the laying vehicle substantially is carried out as follows:

By the aid of a traction vehicle or the like, the first vehicle part 11 is preferably moved continuously and at a constant speed v1 in the direction of arrow v. During this procedure, the line 8 is continuously unreeled from a supply spool, bent to take the shape of meanderlike undulations and offset, if required, which is not necessary, for example, when line 7 (FIG. 2) is laid. The line 7 is merely slightly pressed upwards at the outer sides of the meander, thus representing a procedure that can not be designated as an offset. Afterwards, the undulation-like bent line 8 is discontinuously deposited on the slide 15 at the rear end of the bending and offset unit 14 at a speed v2, which is directed oppositely to arrow v, but by its amount on average it is as great as v1. This means that to an external observer it looks as if the limbs 8a shown in FIG. 3 are basically on a standstill in the direction of arrow v, all the more so since the line 8 on the side remote from the vehicle part 11, i.e. on the extreme left side in FIG. 3, is held by the limbs 8a that have already been fixed in the grooves. However, when the vehicle part 11 is further transported, the limbs 8a slide-off gradually by gravity along the slide 14 also being moved and being inclined obliquely backwards.

The second vehicle part 16 is cyclically stopped and moved to follow the first vehicle part 11, respectively. With the vehicle part 16 being on standstill, a pressing step is carried-out, i.e. a limb 8a conveyed via slide 15 into the pressing station 18 is pressed into the assigned groove 6. After this pressing step, the driving means 24 (FIG. 4) is switched-on. Thereby, the vehicle part 16 is moved in the direction of arrow v, but at a speed v3 which is noticeably faster than the speed v1. On the one hand this serves the purpose of restoring the distance between the two vehicle parts 11 and 16, which has been increased during the standstill phase, back to a preselected measure. On the other hand, by way of a speeded-up movement of the vehicle part 16, it is achieved that the next limb 8a of undulation 8 to be laid is conveyed from the slide 15 to a not precisely shown take-up plate of the pressing station 18 until it reaches a position from which it is captured by the not shown pressing body during the next pressing step and pressed into the next groove assigned to line 8. It is clear that the mean moving speed of the second vehicle part 16, which has been calculated from the sums of standstill phases and moving phases at speed v3, is preferably identical to the moving speed v1 of the first vehicle part 11.

A serious problem arising with the laying vehicle as described before lies in that on the one hand the undulations are discontinuously discharged from the bending and offset unit 14 and on the other hand the distances between the two vehicle parts 11 and 16 constantly vary slightly. Hence, the portions of line undulations located between the two vehicle parts 11, 16 are alternately subjected to tensile and thrust stresses. Consequently, the undulations suffer deformation and the distances between the limbs 8a of the undulations vary constantly. Therefore, it cannot be ensured that the limbs 8a will exactly lie within the effective range of the relevant pressing element after a transport step of the second vehicle part 16. A faulty laying of limbs 8a, therefore, cannot be avoided in a fully automatic operation.

For avoidance of this problem, it is proposed by the present invention to provide a conveying unit (delivery unit) 27 schematically indicated in FIG. 4 to FIG. 7 in an area arranged between an end section 15a (e.g. FIG. 4 and FIG. 6) of each slide 15 assigned to the pressing station 18 and the relevant pressing station 18 itself. This conveying unit 27 serves for taking-up the limbs 8a gliding along said slide 15 and being delivered at the end section 15a thereof and to transport these limbs at basically constant intervals to the pressing station 18. To this effect each conveying unit 27 preferably comprises an endless conveyor belt 28 arranged in parallel to arrow v, which for example is held and guided by two guide pulleys 29, at least one guide pulley 29 being rotatable by a driving means 30, e.g. an electric gear motor, in order to set the conveyor belt 28 into motion around a revolving path. The conveyor belt 28 is provided with an upper strand 28a and a lower strand 28b (FIG. 6), with the upper strand 28a moving opposite to arrow v when the driving means 30 is switched on, while the lower strand 28b moves in the direction of arrow v.

The conveyor belt 28 is provided with take-up pockets 31 which are open towards the outside and which serve for taking-up one limb 8a each of the meander and which are mounted at certain distances to each other in the direction of movement, said distances matching exactly the distances of the grooves 6 of the long-stator 4. The width of these take-up pockets 31 measured in the direction of arrow v expediently is only by a necessary play greater than corresponds to the diameters of the limbs 8a so that the limbs 8a cannot make any substantial movements relative to the conveyor belt 28. Moreover, the arrangement pursuant to FIG. 6 and FIG. 7 has been so chosen that the limbs 8a coming from the slide 15 to a large extent fall automatically into the take-up pockets 31.

Figure 6:
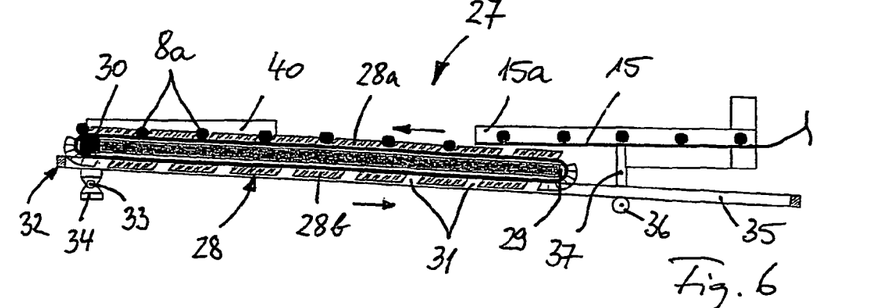
FIG. 6 shows a longitudinal section through an inventive conveying unit of the laying vehicle according to FIG. 4 and FIG. 5.

According to FIG. 5 and FIG. 6, the conveying unit 27 is mounted to a support 32, one end of which is pivotally mounted by means of a bearing pin 33 in a bearing body 34 which is firmly connected to the second vehicle part 16. From there, the support 32 extends in the direction of the first vehicle part 11 substantially horizontally at least up to the end section 15a of the slide 15. The arrangement is of such a kind that a support portion carrying the front guide pulley 29 and facing the first vehicle part 11 projects under the end section 15a of the slide 15 with a slight play as clearly shown on FIG. 6 and is movably supported relatively to the end section 15a in the direction of arrow v. This support portion is preferably extended by a guiding rod 35 fastened to the support 32 and extending in the direction of the first vehicle part 11, said rod resting on a support roller 36 which is rotatably mounted to at least one rail 37 connected to and protruding downwardly from the slide 15. The guiding rod 35 can be moved to and fro on the support roller 36 in the direction of arrow v, and therefore, the bearing pin 33 can be designated as a fixed bearing, while the support roller 36 can be designated as a loose bearing of the conveyor unit 27.

As particularly shown in FIG. 3, a front end portion of the slide 15 is fastened to the bending and offset unit 14 and arranged above the cover plate 3 or gliding strip 2, respectively. From there, the slide 15 is bent in S-shape downwards and towards the rear so that its end section 15a lies beneath the long-stator 4, but above the assigned support end of the support 32. Accordingly, the conveying unit 27 is preferably arranged in a slightly oblique configuration from the outside towards the inside, because the slide 15 laterally passes the long-stator 4, whereas the line 8 must be located exactly beneath the long-stator 4 at the point where it is pressed into the grooves 6 (see also FIG. 1).

Besides, at least on both sides of the end section 15a of the slide 15 and of the conveying unit 27, lateral guides 38, 39 and covers 40 may be provided which prevent lateral slippage of the undulations and ensure a proper transfer of the undulations from the slide 15 to the conveying unit 27 and, respectively, from the conveyor unit to the pressing station 18.

Figure 8:
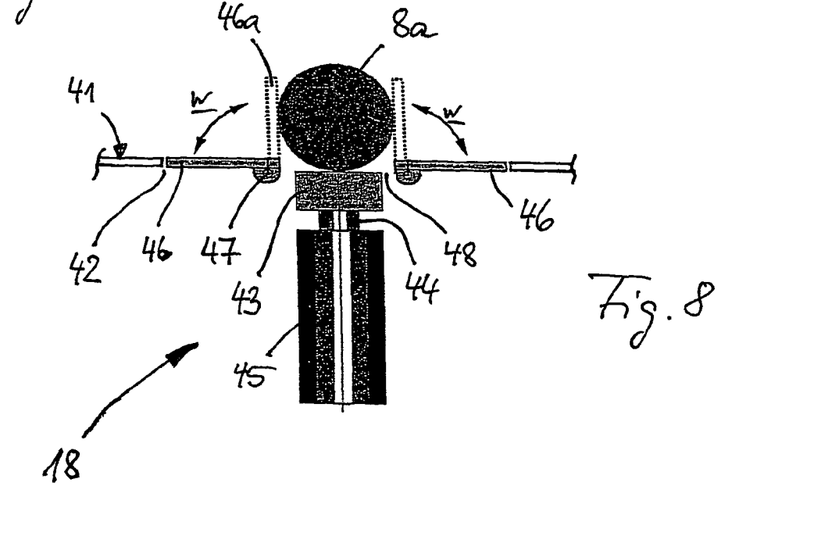
FIG. 8 shows a schematic cross-section through one of four pressing mechanisms of a pressing station of the device according to FIG. 4 to FIG. 7, and FIG. 9 to FIG. 13 in schematic side views show various process steps during insertion of a line into the grooves of the long-stator according to FIG. 2 by the aid of a laying vehicle according to FIG. 4 to FIG. 8.

To enhance the laying speed, the pressing station 18 is so configured that it can press more than one limb 8a of the line undulations per pressing step into the relevant grooves 6 of the long-stator 4. As shown in the embodiment, four limbs 8a can be inserted per pressing step into four associated grooves 6. According to FIG. 4 and FIG. 8, the pressing station 18 comprises a receiving plate 41 onto which the undulations coming from the conveying unit 27 are pushed on in opposite direction to arrow v. The receiving plate 41 is located beneath the long-stator 4 and in parallel to its underside. Beneath openings 42 in the receiving plate 41, four pressing elements 43 are mounted, whereof only one is shown in FIG. 8, and which are spaced in the direction of arrow v. The pressing elements 43 are fastened to the ends of piston rods 44, which for example can be moved up and down by the aid of pneumatic or hydraulic cylinders 45 and vertically to the basically planar surface of the receiving plate 41. Centering plates 46 are provided on both sides of each opening 42 and can swivel around axes 47 arranged in parallel to the grooves 6 in a rack or the like of the pressing station 18. Usually, the centering plates 46 are located in a position as shown by a solid-drawn line, where they terminate basically flush to the surface of the receiving plate 41 and leave a gap 48 in between, the width of which basically corresponds to the width of the limbs 8a of the undulations. Proceeding from this position, the centering plates 46 can be swung by the aid of automatically working swiveling devices not shown here, e.g. also configured as pneumatic or hydraulic cylinder/piston arrangements, around the axes 47 by approximately 90° to the top into a position 46a shown in FIG. 8 by a dotted line and as indicated by double arrows w. In this position 46a, the distance between centering plates 46 standing opposite to each other and vertically arranged is basically equivalent to the thickness of the limbs 8a, while the center distance of each pair of centering plates 46 corresponds to the center distance of the grooves 6.

Figures 9, 10:
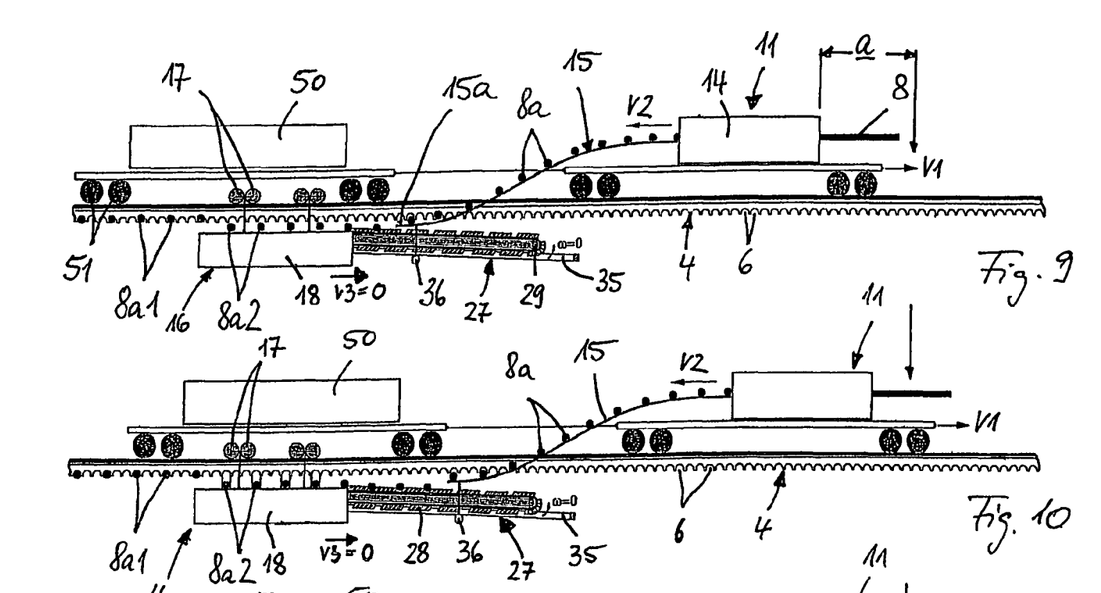

The operating mode depicted in FIG. 9 to FIG. 13 of the laying vehicle according to the present invention is, based on the operating mode of the prior art laying vehicle as described hereinabove with respect to FIG. 3, substantially as follows:

In a first phase of the laying procedure (FIG. 9), the conveying unit 27 is located beneath the slide 15 to a large extent so that its end section 15a has the shortest distance to the pressing station 18. The first vehicle part 11 and, along with it, the slide 15 are continuously moved at a speed v1, and the meanderlike undulations are discontinuously discharged from the bending and offset unit 14 at a mean speed v2=−v1, with the undulations gradually slipping along the slide 15 in the direction of its end section 15a due to the tensile effect of limbs 8a1 that have already been inserted into the grooves 6. However, to an external observer, the discharged undulations basically are on standstill. The second vehicle part 16 and, along with it, also the conveying unit 27, are on standstill as indicated in FIG. 9 by the data v3=0 and ω=0, with the value ω representing the angular velocity of the guide pulleys 29.

After a certain period of time, the first vehicle part 11 has moved forward by a preselected distance in the direction of the arrow v. Therefore, the slide 15 now is in an advanced state as compared with FIG. 9, which can be recognized in FIG. 10, for example, by the relative position of the support roller 36 which has moved to the right together with the slide 15.

The second vehicle part 16 and the conveying unit 27 still are on standstill (v3=0 and ω=0). In difference to FIG. 9, however, the centering plates 46 have been swung into the dotted centering position 46a shown in FIG. 8 in order to thus arrange four limbs 8a2 lying on the receiving plate 41 exactly in position beneath four associated grooves 6 lying above them.

Figure 11:
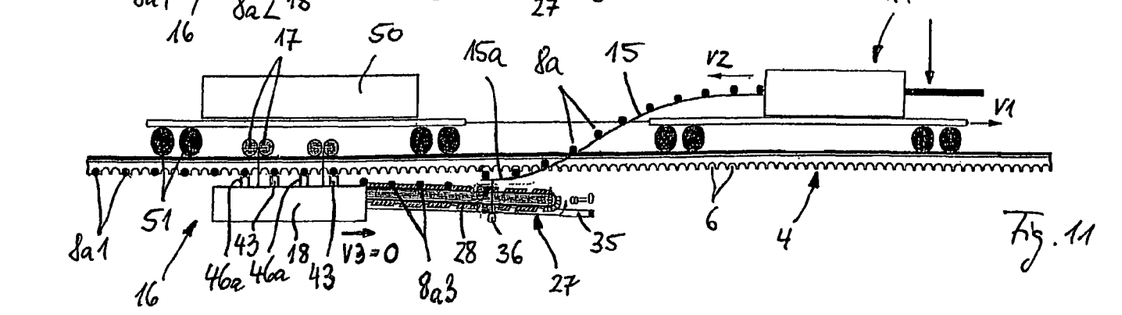

FIG. 11 shows a third phase of the laying procedure. It differs from the phase shown in FIG. 10 in that now the piston rods 44 of the cylinder/piston arrangements (FIG. 8) arranged under the limbs 8a2 have been extended, thus pressing the limbs 8a2 by means of the pressing elements 43 into the assigned grooves 6. The second vehicle part 16 and the conveying unit 27 still are on standstill (v3=0 and ω=0).

Figure 12:
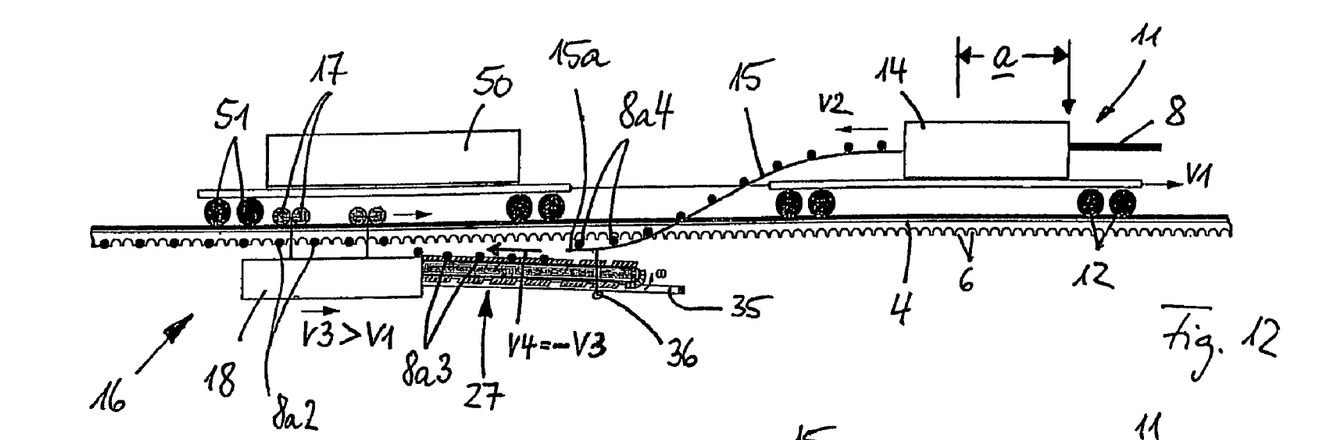

In a next laying phase, as can be seen in FIG. 12, the pressing elements 43 are again retracted and the centering plates 46 are folded-in so that the receiving plate 41 attains a basically planar surface, except for the gaps 48 (FIG. 8). Accordingly, the voids created by the gaps 48 are preferably filled by the upper surfaces of the pressing elements 43. The pressing step described on the basis of FIG. 9 to FIG. 11 has now been completed and finalized.

Figure 13:
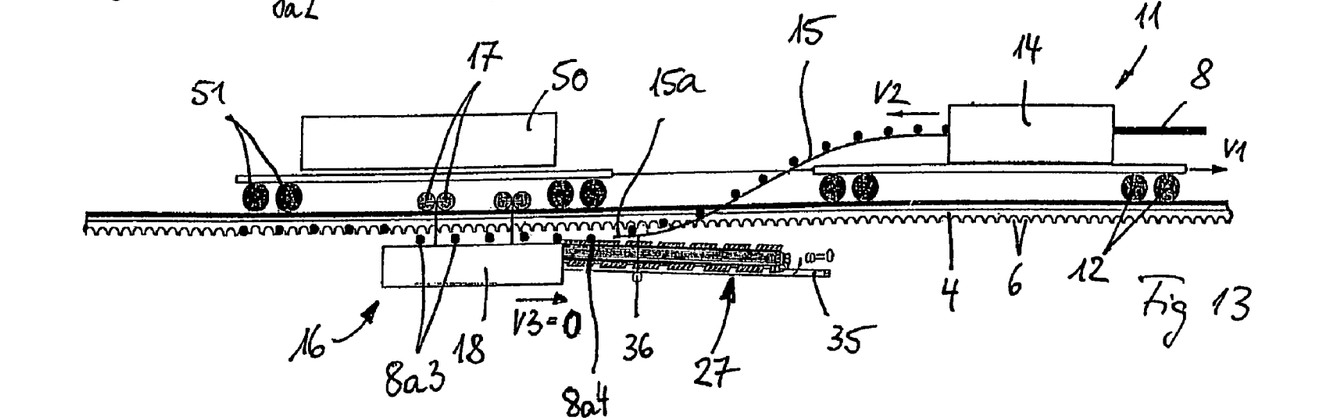

Since the second vehicle part 16 and the conveying unit 27 still are on standstill, the first vehicle part 11 has moved ahead by a certain distance a during the pressing step (see FIG. 9 and FIG. 12). The end section 5a of the slide 15 now has attained its largest distance from the pressing station 18, so that it just lies above the front end of the conveying unit 27. Therefore, the driving means 24 for the vehicle part 16 is switched-on now in order to push it forward at an increased speed v3>v1 in the direction of arrow v until the distance between the two vehicle parts 11 and 16 according to FIG. 9 is restored, as shown in FIG. 13.

During the transport step described on the basis of FIG. 12, also the conveyor belt 28 is set to move in rotation. To this effect, the driving means 30 is switched-on in order to set the guide pulleys 29—counter-clockwise as shown in FIG. 12—in rotation at a preselected angular velocity ω. This angular velocity ω is basically so rated that the upper strand 28a of the transport belt 28 moves opposite to the direction of arrow v at a speed of v4 which by its amount is equal to the speed v3. The upper strand 28a and the receiving plate 41 thus move in opposite directions during this transport step. When the distance of both vehicle parts 11 and 16 as shown in FIG. 9 is reached, the driving means 24 for the vehicle part 16 and the driving means 30 for the conveyor belt 28 are switched-off again so that the next method step as described on the basis of FIG. 9 to FIG. 13 can be initiated.

The transport step according to FIG. 12 entails two movements. On the one hand, the pressing station 18 is moved closer to the bending and offset unit 14, whereby the next limbs, i.e. four limbs 8a3 in this case, are drawn onto the receiving plate 41 as shown by a comparison between FIG. 12 and FIG. 13. At the same time, the conveying unit 27 is pushed forward, whereby it glides on the support roller 36 and can execute slight tilting movements, if any, around the bearing pin 33 (FIG. 6). On the other hand, limbs 8a3 still lying in the take-up pockets 31 as well as succeeding limbs 8a4 of the meanderlike undulations are kept in an idle position relative to the long-stator 4. Since the upper strand 28a of the transport belt 28 moves in opposite direction to the arrow v at the same speed as the conveying unit 27 and together therewith the second vehicle part 16 is moved in the direction of arrow v, the limbs 8a3 and 8a4 and, together with them, the undulations are not carried along in the direction of arrow v. The distances of limbs 8a3, 8a4 are rather kept idle and exactly at the desired measure, i.e. the conveying unit 27 compensates any imbalance and variation in distance that have hitherto been inevitable in the area of slide 15 and at the transition from the slide 15 to the receiving plate 41 due to the different velocities of vehicle parts 11, 16. Even if the limbs 8a3 and 8a4, respectively, fail to immediately fall exactly into the take-up pockets 31 when transferred from the slide 15 to the conveyor belt 28, this will be achieved latest immediately when the driving means 30 has been switched on. This is particularly accomplished, if the take-up pockets 31 are provided with appropriate take-up edges or the like at their ends lying at the rear in the direction of movement. Therefore, on the whole, the conveying unit 27 serves to avoid variations in distance between individual limbs 8a at a point located immediately in front of the pressing station 18, whereby it is ensured that the limbs 8a as shown on FIG. 10 for the limbs 8a2 will always come to rest on the receiving plate exactly at points where the pressing elements 43 are located.

The invention is not limited to the described embodiment currently considered the best. In particular, this applies to the type of driving means used, as well as to the number of limbs 8a simultaneously to be laid into the grooves, and to the configuration of the pressing station 18 as well as the conveying unit 27. For example, the conveyor belt 28, in particular, could be replaced with a conveyor chain or any other flexible transport track equipped with carriers forming the take-ups 31. Furthermore, it could be expedient to couple a third vehicle part 50 according to FIGS. 3 and 9 to the first vehicle part 11, which is also movably mounted on the gliding strips 2 by wheels 51 and which, for example, can transport other equipment items, for instance a service platform or the like arranged in the area of the pressing station. Accordingly, the wheels 51 are arranged at such large distances that a space is created between them in which the wheels 17 of the vehicle part 16 can move faultlessly during the pressing and transport steps, as shown on FIG. 9 to FIG. 13. Alternatively, the two vehicle parts 11 and 50 could also form a single, coherent car box, between the wheels 12, 51 of which the vehicle 16 is movably supported. Furthermore, it is clear that the laying vehicle described hereinabove is provided with the required measuring and control instruments, which however are not described in detail, and which are also carried along on the laying vehicle to particularly serve for ensuring a precise positioning of the limbs 8a of the meanders beneath the grooves 6. Moreover, the laying vehicle described hereinabove is of course suitable for laying the lines of inductors which serve to drive vehicles other than magnetic levitation vehicles. Finally it is self-explanatory that the different features can also be applied in combinations other than those described and shown hereinabove.

The invention claimed is:

1. An apparatus for laying at least one electrical line (7, 8, 9) into grooves (6) of an inductor (4), the apparatus comprising: a first, preceding vehicle part (11) equipped with a bending and offset unit (14) for configuring meander undulations in said line (7, 8, 9) and for discharging said undulations at a rear end, said undulations having limbs (7a, 8a, 9a) and winding heads (7b, 8b, 9b), a second vehicle part (16) following said first vehicle part (11) and being equipped with a pressing station (18) for pressing the limbs (7a, 8a, 9a) of the undulations into the grooves (6) of the inductor (4), with the first and second vehicle parts movable independently of one another, means (24) for displacing the second vehicle part (16) relative to the first vehicle part (11), to keep said second vehicle part (16) on standstill during pressing steps for the limbs (7a, 8a, 9a) and to let said second part (16) follow-up the first vehicle part (11) during transport steps taken between the pressing steps at a moving speed (v3), a slide (15) that is drivingly coupled to the first vehicle part (11) for transferring the undulations to the second vehicle part (16), said slide having an end section (15a) assigned to a pressing station (18), a conveying unit (27) being at least arranged in an area between an end section (15a) of said slide (15) and the pressing station (18) and being coupled to the second vehicle part (16), said conveying unit (27) being arranged to take-up the limbs (7a, 8a, 9a) of the undulations discharged at the end section (15a) of the slide (15) such that the limbs (7a, 8a, 9a) are transferred to the pressing station (18) at substantially equal distances, and driving means (30) for keeping said conveying unit (27) on standstill during the pressing steps and for moving said conveying unit (27) during the transport steps at a speed (v4) which is oppositely equal to said moving speed (v3) of the second vehicle part (16) during the transport steps.

2. An apparatus according to claim 1, wherein the inductor (4) is a long stator of a long-stator of the apparatus formed as a long-stator linear motor.

3. The apparatus according to claim 1, wherein the conveying unit (27) comprises an endless rotating transport belt (28) which in preselected distances is provided with take-up pockets (31) for the limbs (7a, 18a, 9a) of said undulations.

4. The apparatus according to claim 3, wherein the conveyor belt (28) is guided on at least two guide pulleys (29) and that at least one of these guide pulleys (29) is connected to said driving means (30).

5. The apparatus according to claim 3, wherein the take-up pockets (31) have a width that substantially corresponds to the cross-section of the line (7, 8, 9).

6. The apparatus according to claim 1, wherein the conveying unit (27) is pivotally mounted to the pressing station (18) by a fixed bearing (33, 34) and comprises a guiding rod (35) extending in the direction of the first part (11), said guiding rod resting in displaceable arrangement on a support bearing (36, 37) mounted to said slide (15).

7. The apparatus according to claim 1, wherein the pressing station (18) and the conveying unit (27) are so configured and equipped that during each pressing step several limbs (7a, 8a, 9a) of the undulations are simultaneously pressed into the grooves (6) of the inductor (4).

8. The apparatus according to claim 1, wherein the pressing station (18) and the conveying unit (27) are mounted to a common frame (19 to 22) which can be supported by wheels (17) on a cover plate (3) carrying the inductor (4) by means of wheels (17).

9. The apparatus according to claim 8, wherein the inductor (4) is fastened to an underside of said cover plate (3) and provided with grooves (6) being open towards the bottom, and that the pressing station (18) is arranged beneath said inductor (4).

10. An apparatus for laying at least one electrical line (7, 8, 9) into grooves (6) of an inductor (4), the apparatus comprising: a first, preceding vehicle part (11) equipped with a bending and offset unit (14) for configuring meander undulations in said line (7, 8, 9) and for discharging said undulations at a rear end, said undulations having limbs (7a, 8a, 9a) and winding heads (7b, 8b, 9b), a second vehicle part (16) following said first vehicle part (11) and being equipped with a pressing station (18) for pressing the limbs (7a, 8a, 9a) of the undulations into the grooves (6) of the inductor (4), means (24) for displacing the second vehicle part (16) relative to the first vehicle part (11), to keep said second vehicle part (16) on standstill during pressing steps for the limbs (7a, 8a, 9a) and to let said second part (16) follow-up the first vehicle part (11) during transport steps taken between the pressing steps at a moving speed (v3), a slide (15) that is drivingly coupled to the first vehicle part (11) for transferring the undulations to the second vehicle part (16), said slide having an end section (15a) assigned to a pressing station (18), a conveying unit (27) being at least arranged in an area between an end section (15a) of said slide (15) and the pressing station (18) and being coupled to the second vehicle part (16), said conveying unit (27) being arranged to take-up the limbs (7a, 8a, 9a) of the undulations discharged at the end section (15a) of the slide (15) such that the limbs (7a, 8a, 9a) are transferred to the pressing station (18) at substantially equal distances, and driving means (30) for keeping said conveying unit (27) on standstill during the pressing steps and for moving said conveying unit (27) during the transport steps at a speed (v4) which is oppositely equal to said moving speed (v3) of the second vehicle part (16) during the transport steps, wherein the conveying unit (27) is pivotally mounted to the pressing station (18) by a fixed bearing (33, 34) and comprises a guiding rod (35) extending in the direction of the first vehicle part (11), said guiding rod resting in displaceable arrangement on a support bearing (36, 37) mounted to said slide (15).

* * * * *